(12) United States Patent
Bradley

(10) Patent No.: US 7,977,449 B2
(45) Date of Patent: Jul. 12, 2011

(54) POLYAMIDE PIECE REINFORCED WITH LONG FIBERS

(75) Inventor: Gerard Bradley, Saronno (IT)

(73) Assignee: Rhodia Engineering Plastics S.r.l., Ceriano Laghetto (IT)

(*) Notice: Subject to any disclaimer, the term of this patent is extended or adjusted under 35 U.S.C. 154(b) by 114 days.

(21) Appl. No.: 10/549,217

(22) PCT Filed: Mar. 9, 2004

(86) PCT No.: PCT/EP2004/002488
§ 371 (c)(1),
(2), (4) Date: Aug. 7, 2006

(87) PCT Pub. No.: WO2004/081089
PCT Pub. Date: Sep. 23, 2004

(65) Prior Publication Data
US 2007/0154710 A1 Jul. 5, 2007

(30) Foreign Application Priority Data
Mar. 11, 2003 (FR) ...................................... 03 02957

(51) Int. Cl.
*C08G 69/02* (2006.01)
(52) U.S. Cl. ........ 528/310; 528/170; 528/312; 528/323; 528/326; 524/394; 524/397; 524/399; 524/494; 524/496

(58) Field of Classification Search .................. 528/310, 528/170, 312, 32, 323, 326; 524/494, 394, 524/397, 399, 496, 606
See application file for complete search history.

(56) References Cited

U.S. PATENT DOCUMENTS

| | | | | |
|---|---|---|---|---|
| 5,204,396 A * | 4/1993 | Murakami et al. | ............ | 524/394 |
| 5,346,984 A * | 9/1994 | Hasegawa et al. | ............ | 528/323 |
| 5,700,556 A | 12/1997 | Skaletz et al. | | |
| 6,160,080 A * | 12/2000 | Cucinella et al. | ............ | 528/170 |
| 6,906,165 B2 | 6/2005 | Di Silvestro et al. | | |
| 2004/0044105 A1* | 3/2004 | Webster | ............ | 524/99 |

FOREIGN PATENT DOCUMENTS

| | | |
|---|---|---|
| FR | 2743077 | 7/1997 |
| JP | 6145509 | 5/1994 |
| WO | WO 0212373 | 2/2002 |

OTHER PUBLICATIONS

Database WPI Week 199425, Derwent Publications Ltd., London, GB; AN 1994-206689.

* cited by examiner

*Primary Examiner* — James Seidleck
*Assistant Examiner* — Gregory Listvoyb
(74) *Attorney, Agent, or Firm* — Buchanan Ingersoll & Rooney, P.C.

(57) ABSTRACT

The present invention relates to reinforced articles based on a polyamide matrix of high melt flow index and on long fibers. The articles according to the invention exhibit good mechanical properties, such as good tensile strength, good surface finish and good moldability.

32 Claims, No Drawings

POLYAMIDE PIECE REINFORCED WITH LONG FIBERS

This application is an application under 35 U.S.C. Section 371 of International Application Number PCT/EP2004/002488 filed on Mar. 9, 2004.

The present invention relates to reinforced articles based on a polyamide matrix of high melt flow index and on long fibres. The articles according to the invention exhibit good mechanical properties, such as good tensile strength, good surface finish and good mouldability.

PRIOR ART

Among the properties that it is often desired to improve in the case of a polyamide material intended to be formed by techniques such as injection moulding, gas injection moulding, extrusion and extrusion-blow moulding, mention may be made of stiffness, impact strength, dimensional stability, particularly at a relatively high temperature, low post-forming shrinkage, surface appearance and density. The choice of a material for a given application is generally guided by the required level of performance with respect to certain properties and by its cost. In fact the aim is always to obtain new materials that can meet a specification in terms of performance and/or cost.

From the prior art it is known to use polyamide resins reinforced by long fibres, for the purpose of enhancing the mechanical properties of the materials obtained. To produce such materials, it is common practice to use a pultrusion technique, which consists in pulling continuous fibres impregnated with a molten thermoplastic resin through a heated die in order to obtain a rod, which is then cut into granules. This method makes it possible to obtain fibres with the length of the granules. However, this method used with fibres and conventional linear polyamides results in the production of granules that are difficult to process using injection moulding processes. Moreover, the articles obtained have a poor surface appearance.

INVENTION

The Applicant has observed that the use of a polyamide matrix having a high melt flow index in the presence of long and/or continuous fibres allows granules to be manufactured that can be used for the manufacture of articles having good mechanical properties, such as good tensile strength, good surface appearance and good mouldability. Furthermore, it appears that the reinforced articles according to the invention, when subjected to an impact, exhibit a failure mode in which the fragments remain predominantly joined together, that is to say the fragments of these reinforced articles remain attached to one another.

Thus, the first subject of the present invention is a granule comprising a star polyamide matrix and fibres aligned parallel to the length of the granule, which can be obtained by a manufacturing process comprising the following steps:
a) at least one star polyamide matrix is brought in the melt state into contact with fibres chosen from the group comprising:
  i) continuous fibres; and/or
  ii) fibres having a length at least equal to 80%, preferably at least equal to 100%, of the length of the granules,
the star polyamide matrix being obtained by copolymerization using a monomer mixture comprising:

1) a multifunctional compound comprising at least three identical reactive functional groups chosen from amine functional groups and carboxylic acid functional groups;
2) monomers of the following general formulae (IIa) and/or (IIb):

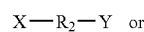  (IIa)

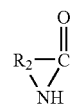  (IIb)

3) optionally, monomers of the following general formula (III):

  (III)

in which:
Z represents a functional group identical to that of the reactive functional groups of the multifunctional compound;
$R_2$, $R_3$, which are identical or different, represent substituted or unsubstituted, aliphatic, cycloaliphatic or aromatic, hydrocarbon radicals containing 2 to 20 carbon atoms and possibly including heteroatoms, such as for example nitrogen and oxygen atoms;
Y is a primary amine functional group when X represents a carboxylic acid functional group, or Y is a carboxylic acid functional group when X represents a primary amine functional group;
b) the composition obtained in step a) is formed into a rod; and
c) the rod obtained in step b) is cut to the length of the granules desired.

The invention also relates to the process for manufacturing granules as such.

The term "carboxylic acid" is understood to mean both carboxylic acids and their derivatives, such as, for example, acid anhydrides, acid chlorides and esters. The term "amines" is understood to mean both amines and their derivatives that are capable of forming an amide bond.

Processes for obtaining star polyamides according to the invention are described for example in the documents FR 2 743 077 and FR 2 779 730. These processes result in the formation of star macromolecular chains, optionally blended with linear macromolecular chains.

If a comonomer 3) is used, the polymerization reaction is advantageously carried out until thermodynamic equilibrium is reached.

The multifunctional compounds—monomers that result in star macromolecular chains—may be chosen from compounds having a tree or dendritic structure. They may also be chosen from compounds represented by the formula (I):

  (I)

in which:
$R_1$ is an aromatic or aliphatic, linear or cyclic, hydrocarbon radical containing at least two carbon atoms and possibly including heteroatoms;
A is a covalent bond or an aliphatic hydrocarbon radical containing 1 to 6 carbon atoms;
Z represents a primary amine radical or a carboxylic acid radical; and
m is an integer between 3 and 8 (both limits inclusive).

According to one particular feature of the invention, the radical $R_1$ is either a cycloaliphatic radical, such as the tetravalent cyclohexanonyl radical, or a 1,1,1-propanetriyl or 1,2,3-propane triyl radical, and/or mixtures thereof.

As other radicals $R_1$ suitable for the invention, mention may be made, by way of example, of substituted or unsubstituted trivalent phenyl and cyclohexanyl radicals, tetravalent diaminopolymethylene radicals with a number of methylene groups advantageously of between 2 and 12, such as the radical coming from EDTA (ethylenediaminetetraacetic acid), octovalent cyclohexanonyl or cyclohexadinonyl radicals, and radicals coming from compounds resulting from the reaction of polyols, such as glycol, pentaerythritol, sorbitol or mannitol, with acrylonitrile.

The radical A is preferably a methylene or polymethylene radical, such as ethyl, propyl or butyl radicals, or a polyoxyalkylene radical, such as the polyoxyethylene radical.

According to one particular embodiment of the invention, the number m is greater than or equal to 3 and advantageously equal to 3 or 4.

The reactive functional group of the multifunctional compound represented by the symbol Z is a functional group capable of forming an amide bond.

Preferably, the multifunctional compounds are chosen from the group comprising: 2,2,6,6-tetrakis(β-carboxyethyl) cyclohexanone, trimesic acid, 2,4,6-tri(aminocaproic acid)-1,3,5-triazine and 4-aminoethyl-1,8-octanediamine.

The monomer of general formulae (IIa) and/or (IIb) is preferably chosen from the group comprising ε-caprolactam and/or the corresponding amino acid: aminocaproic acid, para-aminobenzoic or meta-aminobenzoic acid, 11-aminoundecanoic acid, lauryllactam and/or the corresponding amino acid, 12-aminododecanoic acid, caprolactone, 6-hydroxyhexanoic acid, oligomers thereof and/or mixtures thereof.

The monomer of general formula (III) is preferably chosen from the group comprising: succinic acid, adipic acid, terephthalic acid, isophthalic acid, sebacic acid, azelic acid, dodecanoic acid, dimers of fatty acids, di(β-ethylcarboxy) cyclohexanone, hexamethylenediamine, 5-methyl pentamethylenediamine, metaxylylenediamine, isophorone diamine and 1,4-cyclohexanediamine, and/or mixtures thereof.

It may also be advantageous to use chain stopper compounds, such as monofunctional compounds.

According to the invention, it is possible to use continuous fibres (i) well known to those skilled in the art having, by definition, a length generally greater than one centimeter, or even one meter, and/or fibres (ii) having a length at least equal to 80%, preferably at least equal to 100%, of the length of the desired granules. The fibres (ii) may be arranged in a parallel fashion, so as to obtain a rod, and then granules, comprising fibres aligned parallel to the length of the rod or of the granule.

In step a) the already polymerized polyamide matrix is brought in the melt state into contact with the said fibres. It is also possible to mix the composition obtained.

In step b), the composition obtained may undergo a forming operation using various methods that preserve the length of the fibres. By using forming methods that preserve the length of the fibres it is possible to prevent the said fibres from being cut or crushed. These methods may for example be pultrusion, moulding and extrusion, especially when modified, which result in little or no degradation in the length of the fibres, such as wire-coating or sheath extrusion. In the case of extrusion the extruder is set up so that there is little or no cutting of the fibres, for example by adapting the shear forces. It is also possible, for example, to modify the profile and/or screw rotation speed.

According to the invention, granules comprising fibres having approximately a length at least equal to 80%, preferably at least equal to 90% and more preferably equal to 100%, of the length of the granules are obtained.

The invention relates most particularly to a process for manufacturing a granule as defined above in which a rod is formed in step b) by pultrusion of continuous fibres impregnated with the star polyamide matrix.

According to the present invention, the term "granule" is in general understood to mean a cylinder or a strip having a cross section of variable geometric shape, for example a regular or irregular circular shape or a regular or irregular parallelepipedal shape. The granules according to the present invention may have variable lengths ranging from a few millimeters to a few meters. In the latter case, the granules are called rods. According to a preferred embodiment of the invention, the granules generally have a mean length of 0.5 mm to 30 mm, preferably 1 to 20 mm, particularly 3 to 15 mm and most particularly in the region of 9 to 10 mm.

The constituent material of the fibres is preferably chosen from the group comprising: glass, carbon, graphite, ceramic, aramid, steel, aluminium and tungsten. The granules according to the invention may comprise one or more fibres made of different materials. These fibres may be of variable diameter. In general, these fibres have a mean diameter of 1 to 25 μm.

The proportion by weight of fibres relative to the total weight of the granule may be from 1 to 99%, generally from 5 to 80%, preferably from 10 to 60% and particularly from 20 to 50%.

The granules of the invention may also include other compounds, such as, for example, stabilizers, pigments, fire retardants, catalysts and other reinforcing compounds. They may also include mineral fillers, such as kaolin, wollastonite, talc, nanoparticles or reinforcing fibres such as conventional glass or carbon fibres, or mineral fibres. The granules may also comprise short fibres having a mean length of between 100 and 400 μm.

The present invention also relates to a process for manufacturing an article comprising the following steps:
a) at least granules of the invention as defined above are melted in order to obtain a melt;
b) the melt obtained in step a) undergoes a forming operation in order to obtain an article.

There are several techniques known to those skilled in the art for manufacturing these articles. In general, moulded parts are produced by melting the granules and feeding the melt into devices such as those for transfer moulding, injection moulding, gas injection moulding, extrusion and extrusion-blow moulding.

It is also possible according to the invention to blend the granules with other granules based on reinforced or unreinforced thermoplastic matrices in order to form the melt. This thermoplastic matrix may be composed of at least one polymer chosen from the group comprising: polyamides, such as nylon-6, nylon-6,6 and/or the star polyamide according to the invention; polyesters; polypropylenes; polyethylenes; polyethers; (meth)acrylate-butadiene-styrene (ABS) copolymers; and copolymers and/or blends.

Thus, it is possible to blend, for example, granules according to the invention with reinforced polyamide granules, for example those reinforced by short fibres, or unreinforced polyamide granules.

The subject of the present invention is also a continuous process for manufacturing an article, comprising the following steps:
a) at least one star polyamide matrix as defined above is brought in the melt state into contact with continuous fibres or fibres having a mean length greater than 3 mm, preferably 5 mm and more preferably 10 mm; and b) the composition obtained above undergoes a forming operation before it solidifies using an injection moulding device to obtain the said article.

To do this, it is possible to use in particular a continuous extrusion and injection-moulding process. As mentioned above, the extruder may be set up so that there is little or no cutting of the fibres, preferably so as to obtain fibres having at least a mean length of 0.3 mm or greater, more preferably 0.5 mm or greater. In this continuous process, the composition directly undergoes a forming operation, in order to obtain an article without passing through intermediate materials such as granules.

The said article may comprise a proportion by weight of fibres of between 1 and 80%, preferably between 5 and 70% and more preferably between 5 and 60%.

The subject of the present invention is also a process for manufacturing articles that includes a filament winding step comprising the following steps:

a) at least one star polyamide matrix as defined above is brought in the melt state into contact with continuous fibres so as to cover the fibres with the said matrix; and b) the fibres obtained in step a) are wound onto a rotating mandrel.

The fibres covered with the polyamide matrix may especially take the form of a tape. The filament winding technique makes it possible to manufacture, among others, tubes, pipes or tanks.

The articles of the invention may for example be articles for the motor vehicle industry, in particular for the manufacture of body parts, electrical components and accessories for various activities, such as, for example, sporting activities.

Specific language is used in the description so as to make it easier to understand the principle of the invention. Nevertheless, it should be understood that no limitation on the scope of the invention is envisaged by the use of this specific language. Modifications and improvements may especially be envisaged by a person skilled in the relevant art on the basis of his own general knowledge.

The term "and/or" includes the meanings "and" and "or", and also all the other possible combinations of elements connected with this term.

Other details or advantages of the invention will become more clearly apparent in the light of the examples given below solely by way of indication.

EXPERIMENTAL PART

1) Composites

Composites based on polyamides reinforced by glass fibres were prepared on the following products:

F1: glass fibres for pultrusion; EC17 4588 continuous glass fibres sold by PPG;

F2: glass fibres for extrusion: glass fibres having length of 4.5 mm and a diameter of 10 μm;

P1: star polyamide, obtained by copolymerization of caprolactam in the presence of 0.41 mol of 2,2,6,6-tetrakis(β-carboxyethyl) cyclohexanone in moles of compound, using a process described in Document FR 2 743 077, having a melt flow index (measured at 275° C. under a load of 325 g) of 30 g/10 minutes according to the ISO 1133 standard;

P2: star polyamide, obtained by copolymerization of caprolactam in the presence of 0.48 mol of 2,2,6,6-tetrakis(β-carboxyethyl) cyclohexanone in moles of compound, using a process described in Document FR 2 743 077, having a melt flow index (measured at 275° C. under a load of 325 g) of 45 g/10 minutes according to the ISO 1133 standard; and P3: linear nylon-6 polyamide obtained by the polymerization of caprolactam, with a melt flow index (measured at 275° C. under a load of 325 g) of 10 g/10 minutes according to the ISO 1133 standard.

50% by weight of continuous glass fibres were impregnated with 50% by weight of molten polymer in order to form a blend. This was then pultruded in order to produce continuous polyamide-covered glass fibres. A rod was thus obtained, which was then cut to form granules 9 millimeters in length, the length of the glass fibres being equal to the length of the granules.

To obtain granules comprising short glass fibres, a conventional twin-screw extruder was used, this being of the Werner & Pfleiderer ZSK 70 type, with the following temperature profile in degrees Celsius: zone 1: 240; zone 2; 245; zone 3: 250; zone 4: 255; zone 5: 260; zone 6: 265 and with a screw rotation speed of 330 rpm.

The granules obtained are indicated in the table below:

TABLE 1

| | | GRANULES | | | | |
|---|---|---|---|---|---|---|
| | | A1 | C1 | D1 | E1 | G1 |
| Star polyamide | % | P1: 70 | P2: 50 | P2: 50 | | |
| Linear polyamide (nylon-6) | % | | | | P3: 70 | P3: 50 |
| Glass fibres | % | F2: 30 | F2: 50 | F1: 50 | F2: 30 | F1: 50 |
| Method of preparation | — | Extrusion | Extrusion | Pultrusion | Extrusion | Pultrusion |
| Mean length of the glass fibres | μm | 374 | 350 | 9000 | 360 | 9000 |
| Mean length of the granules | mm | 3 | 3 | 9 | 3 | 9 |

To obtain articles comprising a lower proportion of glass fibres, the granules obtained above by pultrusion were blended with polymer granules containing no glass fibres using a mechanical blender.

The blends obtained are indicated in the table below:

TABLE 2

| BLEND | % by weight | B1 | F1 |
|---|---|---|---|
| 9 mm granules D1 (long fibres) | % | 60 | — |
| 9 mm granules G1 (long fibres) | % | — | 60 |
| 3 mm polyamide granules | % | P2: 40 | P3: 40 |

The granules or blends A1 to G1 were used to obtain articles A to G respectively.

The injection moulding was carried out using granules A1, C1, D1, E1 and G1 or blends B1 and F1 using a Demag Ergotech 50-270 machine under standard conditions, namely temperature profile in degrees Celsius: zone 1: 250; zone 2: 255; zone 3: 255; zone 4: 260; injection speed: 70 mm/s; injection pressure: see table 3; screw rotation speed: 70 rpm; moulding temperature: 80° C.

The final compositions of the articles and their mechanical properties are listed in the following table. The percentages (%) in the compositions are by weight relative to the total of the composition.

TABLE 3

| | | ARTICLES | | | | |
|---|---|---|---|---|---|---|
| | | B | C | D | F | G |
| Star polyamide | % | P2: 70 | P2: 50 | P2: 50 | | |
| Linear polyamide (nylon-6) | % | | | | P3: 70 | P3: 50 |
| Glass fibres | % | 30 | 50 | 50 | 30 | 50 |
| Tensile strength | N/mm$^2$ | 143 | 214 | 218 | 165 | 193 |
| Elongation at break | % | 1.9 | 2.1 | 1.9 | 2.1 | 1.6 |
| Tensile modulus | N/mm$^2$ | 8620 | 16000 | 15600 | 10000 | 15800 |
| Charpy notched impact | kJ/m$^2$ | 20.2 | 14.6 | 36.6 | 17.1 | 22.0 |
| Maximum force | kN | 7.0 | 9.4 | 10.7 | 7.2 | 8.1 |
| Total fracture energy | J | 50.3 | 52.2 | 74.1 | 40.0 | 62.3 |
| Failure mode | — | — | non-explosive | non-explosive | non-explosive | non-explosive | non-explosive |
| Surface appearance | — | — | Good | Good | Good | Poor | Poor |
| Injection pressure | bar | — | 150 | 150 | 150 | 210 | 245 |

It may be seen in particular that the reinforced articles according to the invention comprise two glass fibre populations that differ by their mean length: approximately 50% of the fibres have a mean length of 0.5 mm and approximately 50% of the fibres have a mean length of 2 mm.

The mechanical properties of the articles were measured as follows:
- tensile strength according to the ISO 527 standard;
- elongation at break according to the ISO 527 standard;
- tensile modulus according to the ISO 527 standard;
- Charpy notched impact strength according to the ISO 179/1eA standard;
- maximum force and total fracture energy (drop weight impact) according to the ISO 6603-2 standard on specimens 3 mm in thickness. The failure mode is called explosive when detachment of fragments of the plastic part is observed;
- surface appearance according to a visual assessment, so as to determine whether the surface appearance is good or poor; and
- injection pressure required for the injection moulding.

The mechanical properties were measured, after conditioning the as-moulded specimens at 23° C. in the dry state in a moisture-free container, according to the ISO 1874-2 standard.

The compositions according to the present invention thus make it possible to obtain moulded articles that have improved mechanical properties, especially as regards impact strength and tensile strength, while still having a good surface appearance and good mouldability.

In addition, it appears that the failure modes are completely different depending on the article. According to the prior art, when article A undergoes the drop weight impact test according to the ISO 6603-2 standard, the said article is observed to explode with fragments of this article becoming detached. When article A according to the invention undergoes the same drop weight impact test, no explosion of the said article is observed, the parts of this article remaining assembled.

2) Blends

Tests were also carried out to demonstrate the advantages, as regards mechanical properties, of an article comprising long fibres and short fibres.

Granules 9 mm in length, having a high concentration of long glass fibres, were added to granules 3 mm in length containing short glass fibres, in a mechanical blender. The star polyamide P1 was also added to the mechanical blender so as to adjust the glass fibre content.

In these trials, the final compositions of the articles thus contained 30% glass fibre by weight.

The injection moulding for obtaining the articles was mentioned above.

The compositions of the articles are given in the following table. The percentages (%) in the composition are by weight relative to the total of the final composition.

TABLE 4

| | | ARTICLES | | | | | |
|---|---|---|---|---|---|---|---|
| | | A | H | I | J | K | B |
| 3 mm granules A1 (short fibres) | % | 100 | 83.5 | 67.0 | 50.0 | 34.0 | — |
| 9 mm granules D1 (long fibres) | % | — | 10.0 | 20.0 | 30.0 | 40.0 | — |
| Polyamide P1 | % | — | 6.5 | 13.0 | 19.5 | 26.0 | — |
| Short glass fibres from granules A1 | % | 30 | 25 | 20 | 15 | 10 | — |
| Long glass fibres from granules D1 | % | — | 5 | 10 | 15 | 20 | 30 |
| Charpy notched impact | kJ/m$^2$ | 10.2 | 10.8 | 12.1 | 13.8 | 14.6 | 20.2 |
| Total fracture energy | J | 40.1 | 40.1 | 42.3 | 44.6 | 45.8 | 50.3 |

The invention claimed is:

1. A granule comprising a star polyamide matrix and fibers aligned parallel to the length of the granule, obtained by a manufacturing process comprising the steps of:
   a) bringing in a melt state into contact at least one star polyamide matrix with: continuous fibers; and/or fibers having a length at least equal to 80%, optionally at least equal to 100%, of the length of the granules, the star polyamide matrix being obtained by copolymerization using a monomer mixture comprising:
   1) a multifunctional compound having at least three identical reactive functional groups chosen from amine functional groups and carboxylic acid functional groups;
   2) monomers of the following general formulae (IIa) and/or (IIb):

(IIa)

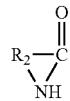

(IIb)

and,
3) optionally, monomers of the following general formula (III):

$$Z-R_3-Z \quad (III)$$

in which:
Z represents a functional group identical to that of the reactive functional groups of the multifunctional compound;
$R_2$, $R_3$, which are identical or different, represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional group;

b) the composition obtained in step a) is formed into a rod; and
c) the rod obtained in step b) is cut to the length of the granules desired.

2. The granule according to claim 1, wherein the multifunctional compound is represented by the formula (I):

$$R1-[A-z]_m \quad (I)$$

in which:
$R_1$ is an aromatic or aliphatic, linear or cyclic, hydrocarbon radical containing at least two carbon atoms and optionally including heteroatoms;
A is a covalent bond or an aliphatic hydrocarbon radical having 1 to 6 carbon atoms;
Z represents a primary amine radical or a carboxylic acid radical; and
m is an integer between 3 and 8.

3. The granule according to claim 1, wherein the multifunctional compound is: 2,2,6,6-tetrakis(β-carboxyethyl)cyclohexanone, trimesic acid, 2,4,6-tri(aminocaproic acid)-1,3,5-triazine, 4-aminoethyl-1,8-octanediamine, or mixtures thereof.

4. The granule according to claim 1, wherein the monomer of general formulae (IIa) and/or (IIb) is ε-caprolactam, the corresponding amino acid of ε-caprolactam aminocaproic acid, para-aminobenzoic acid, meta-aminobenzoic acid, 11-aminoundecanoic acid, lauryllactam, the corresponding amino acid of lauryllactam, 12-aminododecanoic acid, caprolactone, or 6-hydroxyhexanoic acid, or oligomers thereof.

5. The granula according to claim 1, wherein the monomer of general formula (III) is succinic acid, adipic acid, terephthalic acid, isophthalic acid, sebacic acid, azelic acid, dodecanoic acid, dimers of fatty acids, di(β-ethylcarboxy)cyclohexanone, hexamethylenediamine, 5-methyl pentamethylenediamine, metaxylylenediamine, isophorone diamine or 1,4-cyclohexanediamine.

6. The granule according to claim 1, wherein said granule has a mean length of 0.5 to 30 mm, optionally 3 to 15 mm.

7. The granule according to claim 1, wherein the constituent material of the fibers is: glass, carbon, graphite, ceramic, aramid, steel, aluminium or tungsten.

8. The granule according to claim 1, wherein the fibers present a proportion by weight of fibers relative to the granule of between 5 and 80%.

9. The granule according to claim 1, wherein the composition is formed into a rod in step b) by a pultrusion, moulding or an extrusion method.

10. A process for manufacturing an article comprising the steps of:
a) melting a granule prepared by the process of claim 1; and
b) carrying out a forming operation on the melt obtained in step a) in order to obtain an article.

11. A process according to claim 10, wherein the melt in step a) is obtained by blending the granule with granules based on a thermoplastic matrix.

12. A process according to claim 10, wherein the forming operation of step b) is transfer moulding, injection moulding, gas injection moulding, extrusion or extrusion-blow moulding.

13. A process for manufacturing an article, comprising the steps of:
a) providing a star polyamide matrix obtained by copolymerization a monomer mixture comprising:
1) a multifunctional compound having at least three identical reactive functional groups chosen from amine functional groups and carboxylic acid functional groups;
2) monomers of the following general formulae (IIa) and/or (IIb):

$$X-R_2-Y \text{ or} \quad (IIa)$$

$$R_2-\overset{O}{\underset{NH}{\overset{\|}{C}}} \quad (IIb)$$

and
3) optionally, monomers of the following general formula (III):

$$Z-R_3-Z \quad (III)$$

in which:
Z represents a functional group identical to that of the reactive functional groups of the multifunctional compound;
$R_2$, $R_3$ which are identical or different represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional group;

b) obtaining a melt by bringing the star polyamide matrix, into contact in the melt state with continuous fibers or fibers having a mean length greater than 3 mm; and
c) carrying out a forming operation on the melt obtained in step before the melt solidifies using an injection moulding device to obtain said article.

14. A process for manufacturing articles having a filament winding step comprising the steps of:
a) providing a star polyamide matrix obtained by copolymerization a monomer mixture comprising:
1) a multifunctional compound having at least three identical reactive functional groups chosen from amine functional groups and carboxylic acid functional groups;
2) monomers of the following general formulae (IIa) and/or (IIb):

$$X—R_2—Y \quad \text{or} \quad \text{(IIa)}$$

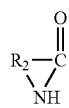
(IIb)

and 3) optionally, monomers of the following general formula (III):

$$Z—R_3—Z \quad \text{(III)}$$

in which:
Z represents a functional group identical to that of the reactive functional groups of the multifunctional compound;
$R_2$, $R_3$ which are identical or different represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional grow;

b) obtaining a melt by bringing the star polyamide matrix into contact in the melt state with continuous fibers so as to cover the fibers with the said matrix; and c) winding the fibers obtained in step onto a rotating mandrel.

15. A granule comprising a star polyamide matrix and fibers aligned parallel to the length of the granule, obtained by a manufacturing process comprising the steps of:
a) bringing in the melt state into contact at least one star polyamide matrix with: continuous fibers; and/or fibers having a length at least equal to 80%, optionally at least equal to 100%, of the length of the granules, the star polyamide matrix being obtained by copolymerization using a monomer mixture comprising:
1) a multifunctional compound having at least three identical reactive functional groups chosen from amine functional groups and carboxylic acid functional groups;
2) monomers of the following general formulae (IIa) and/or (IIb):

$$X—R_2—Y \quad \text{or} \quad \text{(IIa)}$$

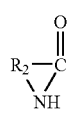
(IIb)

and, 3) optionally, monomers of the following general formula (III):

$$Z—R_3—Z \quad \text{(III)}$$

in which:
Z represents a functional group identical to that of the reactive functional groups of the multifunctional compound;
$R_2$, $R_3$, which are identical or different, represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional group;

b) the composition obtained in step a) is formed into a rod; and c) the rod obtained in step b) is cut to the length of the granules desired;

wherein at least one of the mechanical properties selected from the group consisting of tensile strength, % elongation at break, Charpy notched impact, maximum force and total fracture energy, of an article produced from said granule are greater than that of an article produced from a comparable granule where the matrix is a linear polyamide.

16. The granule of claim 15, wherein the tensile strength, % elongation at break, Charpy notched impact, maximum force and total fracture energy of an article produced from said granule are greater than that of an article produced from a comparable granule where the matrix is a linear polyamide.

17. A process for manufacturing an article comprising the steps of:
a) melting a granule prepared by the process of claim 1; and
b) carrying out a forming operation on the melt obtained in step a) in order to obtain an article;
wherein at least one of the mechanical properties selected from the group consisting of tensile strength, % elongation at break, Charpy notched impact, maximum force and total fracture energy of the article are greater than that of an article produced from a comparable granule where the matrix is a linear polyamide.

18. The process of claim 17, wherein the tensile strength, % elongation at break, Charpy notched impact, maximum force and total fracture energy of the article are greater than that of an article produced from a comparable granule where the matrix is a linear polyamide.

19. An article comprising molded granules comprising a star polyamide matrix and fibers, wherein the star polyamide matrix comprises a copolymer of a monomer mixture comprising:
1) a multifunctional compound having at least three identical reactive functional groups chosen from amine functional groups and carboxylic acid functional groups;
2) monomers of the following general formulae (IIa) and/or (IIb):

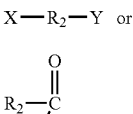

and, 3) optionally, monomers of the following general formula (III):

$$Z—R_3—Z \quad \text{(III)}$$

in which:
Z represents a functional group identical to that of the reactive functional groups of the multifunctional compound;

R$_2$, R$_3$, which are identical or different, represent substituted or unsubstituted, aliphatic, cycloaliphatic or aromatic, hydrocarbon radicals having 2 to 20 carbon atoms optionally including heteroatoms; and Y is a primary amine functional group when X represents a carboxylic acid functional group, or Y is a carboxylic acid functional group when X represents a primary amine functional group;

and the fibers comprise two populations of fibers, each of which comprise approximately 50% of the fibers, wherein the first population of fibers has a mean length of about 0.5 mm and the second population of fibers has a mean length of about 2 mm.

20. A blend comprising:
(I) a material formed from a granule comprising a star polyamide matrix and fibers aligned parallel to the length of the granule, obtained by a manufacturing process comprising the steps of:
a) bringing in the melt state into contact at least one star polyamide matrix with: continuous fibers; and/or fibers having a length at least equal to 80%, optionally at least equal to 100%, of the length of the granules,
the star polyamide matrix being obtained by copolymerization using a monomer mixture comprising:
1) a multifunctional compound having at least three identical reactive functional groups chosen from amine functional groups and carboxylic acid functional groups;
2) monomers of the following general formulae (IIa) and/or (IIb):

$$X-R_2-Y \quad \text{or} \quad \text{(IIa)}$$

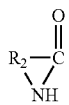
(IIb)

and,
3) optionally, monomers of the following general formula (III):

$$Z-R_3-Z \quad \text{(III)}$$

in which:
Z represents a functional group identical to that of the reactive functional groups of the multifunctional compound;
R$_2$, R$_3$, which are identical or different, represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional group;
b) the composition obtained in step a) is formed into a rod; and
c) the rod obtained in step b) is cut to the length of the granules desired, and
(II) a material formed from polymer granules optionally comprising fibers,
wherein an article produced from said blend has at least one of the mechanical properties selected from the group consisting of tensile strength, % elongation at break, Charpy notched impact, maximum force and total fracture energy that are greater than that of an article produced from a comparable granule where the matrix is a linear polyamide.

21. The process of claim 10, further comprising the step of forming a blend comprising the melted granule of step (a) and polymer granules optionally comprising fibers.

22. The process of claim 13, further comprising the step of forming a blend comprising the melted composition of step (a) and polymer granules optionally comprising fibers.

23. The process of claim 14, further comprising the step of forming a blend comprising the melted composition of step (a) and polymer granules optionally comprising fibers.

24. The process of claim 17, further comprising the step of forming a blend comprising the melted composition of step (a) and polymer granules optionally comprising fibers.

25. A method of manufacturing a granule comprising a star polyamide matrix and fibers aligned parallel to the length of the granule, the method comprising the steps of:
a) bringing in a melt state into contact at least one star polyamide matrix with: continuous fibers; and/or fibers having a length at least equal to 80%, optionally at least equal to 100%, of the length of the granules,
the star polyamide matrix being obtained by copolymerization using a monomer mixture comprising:
1) a multifunctional compound having at least three identical reactive functional groups chosen from amine functional groups and carboxylic acid functional groups;
2) monomers of the following general formulae (IIa) and/or (IIb):

$$X-R_2-Y \quad \text{or} \quad \text{(IIa)}$$

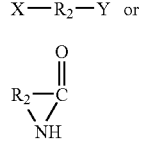
(IIb)

and,
3) optionally, monomers of the following general formula (III):

$$Z-R_3-Z \quad \text{(III)}$$

in which:
Z represents a functional group identical to that of the reactive functional groups of the multifunctional compound;
R$_2$, R$_3$, which are identical or different, represent substituted or unsubstituted, aliphatic, cycloaliphatic or aromatic, hydrocarbon radicals having 2 to 20 carbon atoms optionally including heteroatoms; and
Y is a primary amine functional group when X represents a carboxylic acid functional group, or Y is a carboxylic acid functional group when X represents a primary amine functional group;
b) the composition obtained in step a) is formed into a rod; and
c) the rod obtained in step b) is cut to the length of the granules desired.

26. The method of manufacturing a granule according to claim 25, wherein the multifunctional compound is represented by the formula (I):

$$R_1\text{-}[A\text{-}z]_m \qquad (I)$$

in which:
R₁ is an aromatic or aliphatic, linear or cyclic, hydrocarbon radical containing at least two carbon atoms and optionally including heteroatoms;
A is a covalent bond or an aliphatic hydrocarbon radical having 1 to 6 carbon atoms; Z represents a primary amine radical or a carboxylic acid radical; and
m is an integer between 3 and 8.

27. The method of manufacturing the granule according to claim 25, wherein the multifunctional compound is: 2,2,6,6-tetrakis(6-carboxyethyl)cyclohexanone, trimesic acid, 2,4,6-tri(aminocaproic acid)-1,3,5-triazine, 4-aminoethyl-1,8-octanediamine, or mixtures thereof.

28. The method of manufacturing the granule according to claim 25, wherein the monomer of general formulae (IIa) and/or (IIb) is ε-caprolactam, the corresponding amino acid of ε-caprolactam aminocaproic acid, para-aminobenzoic acid, meta-aminobenzoic acid, 11-aminoundecanoic acid, lauryllactam, the corresponding amino acid of lauryllactam, 12-aminododecanoic acid, caprolactone, or 6-hydroxyhexanoic acid, or oligomers thereof.

29. The method of manufacturing the granule according to claim 25, wherein the monomer of general formula (III) is succinic acid, adipic acid, terephthalic acid, isophthalic acid, sebacic acid, azelic acid, dodecanoic acid, dimers of fatty acids, di(β-ethylcarboxy)cyclohexanone, hexamethylenediamine, 5-methyl pentamethylenediamine, metaxylylenediamine, isophorone diamine or 1,4-cyclohexanediamine.

30. The method of manufacturing the granule according to claim 25, wherein said granule has a mean length of 0.5 to 30 mm, optionally 3 to 15 mm.

31. The method of manufacturing the granule according to claim 25, wherein the constituent material of the fibers is: glass, carbon, graphite, ceramic, aramid, steel, aluminium or tungsten.

32. The method of manufacturing the granule according to claim 25, wherein the fibers present a proportion by weight of fibers relative to the granule of between 5 and 80%.

* * * * *